United States Patent [19]

Mont

[11] 4,157,531
[45] Jun. 5, 1979

[54] AUTOMOBILE EMERGENCY SIGNAL

[76] Inventor: Howard I. Mont, 9 Overlook Dr., Port Washington, N.Y. 11050

[21] Appl. No.: 730,545

[22] Filed: Oct. 7, 1976

[51] Int. Cl.² .......................................... B60Q 7/02
[52] U.S. Cl. ..................................... 340/107; 340/87; 340/90; 340/321; 40/573; 40/489; 40/534; 40/562; 116/63 P; 362/362
[58] Field of Search ............... 340/107, 84, 87, 90, 340/119, 95, 114 R, 114 B, 321; 40/132 R, 132 A, 132 D, 63 R, 129 C, 129 A, 140, 125 H, 125 N, 125 R, 546, 573, 373, 489, 575, 534, 586, 579, 562, 564, 612, 610, 618; 240/8.18, 10, 5; 116/63 R, 63 P, 63 C, 63 T; 362/366, 367, 362

[56] References Cited

U.S. PATENT DOCUMENTS

| | | | |
|---|---|---|---|
| 1,544,420 | 6/1925 | Basterreix | 340/84 |
| 1,930,774 | 10/1933 | Scherfee | 340/84 |
| 2,547,192 | 4/1951 | Zentner | 40/132 R |
| 2,580,938 | 1/1952 | Martin | 340/321 |
| 2,620,388 | 12/1952 | Franz | 340/90 |
| 2,623,934 | 12/1952 | De Bow et al. | 340/321 |
| 2,856,598 | 10/1958 | Bokair | 340/90 |
| 3,139,611 | 6/1964 | Fleming | 340/321 |
| 3,274,548 | 9/1966 | Brimsek | 340/107 |
| 3,299,553 | 1/1967 | Newman et al. | 340/124 |
| 3,800,430 | 4/1974 | Samra | 340/87 |
| 3,810,092 | 5/1974 | Tucker | 340/107 |

*Primary Examiner*—John W. Caldwell, Sr.
*Assistant Examiner*—Donnie L. Crosland
*Attorney, Agent, or Firm*—Lackenbach, Lilling & Siegel

[57] ABSTRACT

A signal lamp comprises a housing defining two openings of corresponding overall shape and size, and an electrical light source mounted in the housing to provide a light beam which leaves the housing by way of one of the openings. The lamp also comprises translucent members, each of which corresponds in overall shape and size to the shape and size of each of the two openings, and retaining nibs for retaining any one of the translucent members in the first opening, so that the light beam passes through that translucent member when leaving the housing, and for retaining any one at least of the translucent members in the second opening. At least one of the translucent members includes a color filter so that when that translucent member is fitted in the first opening the color of the light beam is modulated by the color filter.

4 Claims, 3 Drawing Figures

AUTOMOBILE EMERGENCY SIGNAL

This invention relates to signal lamps.

An automobile traveller who finds himself in difficulties, for example through shortage of gasoline or by requiring medical attention for himself or his passenger, may have severe problems in communicating the nature of his difficulties to other highway uses so that they can send for help. This is particularly so when the traveller finds himself stranded on an expressway or the like, because other drivers are prohibited from stopping to render assistance. It is therefore an object of the present invention to provide a signal lamp which may be used by an automobile traveller to inform other road users that he is in difficulties. The invention may also be used to furnish non-emergency information.

According to the present invention there is provided a signal lamp comprising:
   a housing having wall portions defining a first opening providing access to the interior of the housing and also defining a second opening corresponding in overall shape and size to said first opening;
   an electrical light source mounted in the interior of the housing to provide in operation a light beam which leaves the housing by way of said first opening;
   a plurality of translucent members, each of which corresponds in overall size and shape to the overall size and shape of each of said first and second openings; and
   means for retaining any one of said translucent members in said first opening, so that said light beam passes through the translucent member fitted in the first opening when leaving the housing, and for retaining any one at least of the translucent members in said second opening,
   at least one of the translucent members including a color filter so that when that translucent member is fitted in the first opening the color of the light beam is modulated by the color filter.

For a better understanding of the invention, and to show how the same may be carried into effect, reference will now be made, by way of example, to the accompanying drawing in which.

Figure 1:
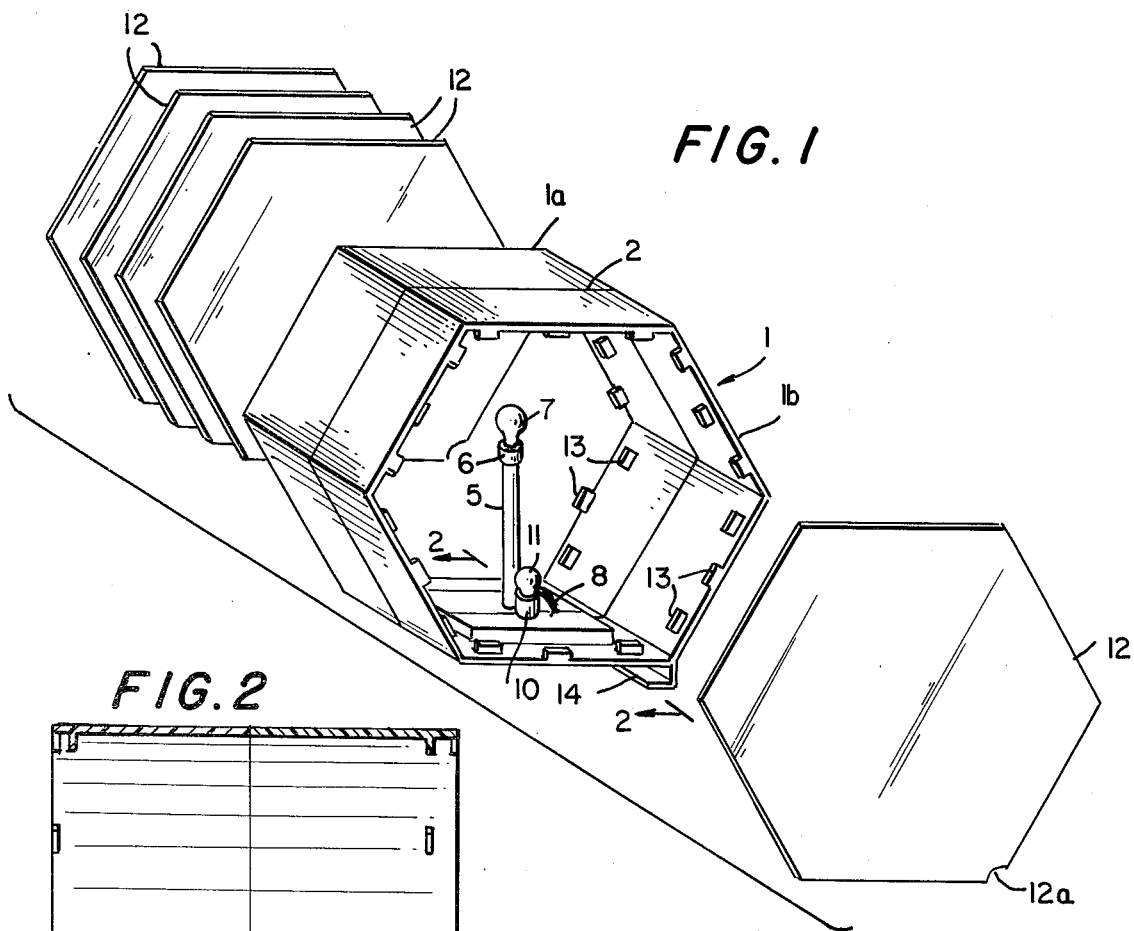
FIG. 1 shows in perspective an exploded view of a signal lamp embodying the present invention.

The illustrated lamp comprises a generally hexagonal housing 1 which is open at both ends. The housing is made of injection molded plastic material. It has been found that as a practical matter it is advantageous to mold the housing in two parts 1a and 1b, which are then secured together along the line 2.

In one side of the hexagon a recess 3 is molded for accommodating a magnet 4. Extending upwardly from the recess 3 is a hollow stem 5 having a miniature bayonet socket 6 secured to its upper end. An electrical bulb 7 is fitted in the socket 6. A cord 8 is connected to the socket 6, and passes from the socket down through the hollow stem 5 and leaves the stem 5 by way of an opening 9 at its lower end.

Also within the housing 1 is a plastic receptacle 10 which holds a spare bulb 11.

Figure 3:
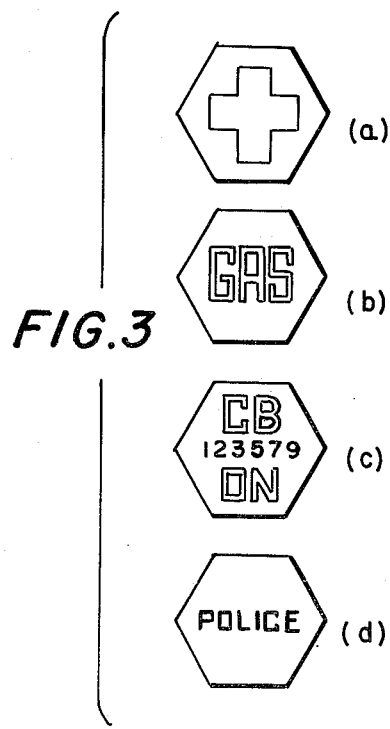
FIG. 3 shows in elevation respective views of four components of the lamp.

The lamp also comprises a set of hexagonal translucent plates 12, a selection of which is shown in FIG. 3.

Figure 2:
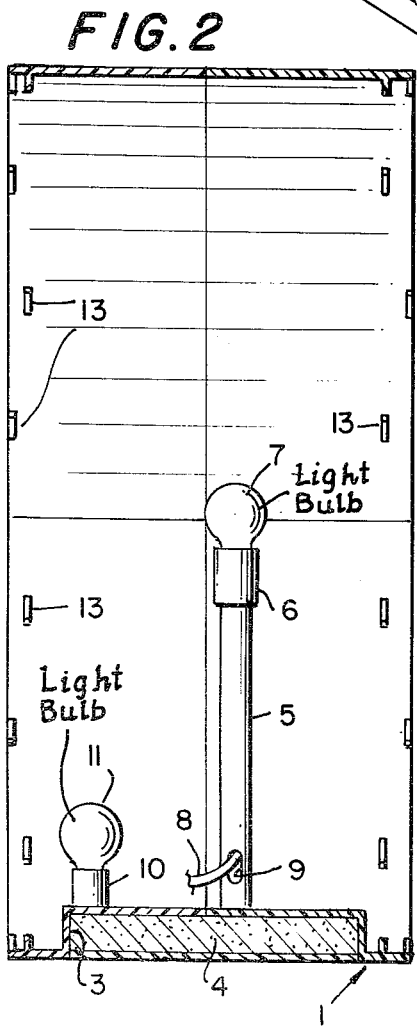
FIG. 2 shows a partial sectional view of the lamp.

Each of the plates is sized and shaped to fit snuggly within the housing 1, and the housing is provided with nibs 13 for retaining the plates in the housing. It will be noted from FIG. 2 that the nibs at the front of the housing (the left of FIG. 2) are spaced apart sufficiently to accommodate one of the plates 12, while the nibs at the rear of the housing (the right of FIG. 2) are spaced further apart, so as to permit four plates to be accommodated therebetween. Each of the plates has at one corner a cut-out portion 12a, to permit the cord 8 to leave the housing by way of the front of the housing when any one of the plates is fitted in the front of the housing, and also to facilitate removal of the plate from the housing, by inserting a finger through the cut-out portion to pull the plate past the nibs.

The housing has at its underside a bracket 14 which fits over the top of the window of an automobile to enable the lamp to be mounted on the automobile. If the automobile is stationary, the lamp may be placed on the roof, for example, and it will be held in position by the action of the magnet 4.

To permit the lamp to be connected into the electrical system of an automobile, the cord 8 is provided at its free end with a plug of the type which will fit into a conventional cigarette lighter.

The plates 12 are made from die-cut styrene or vinyl. When the user of the lamp requires medical or police assistance, he can fit the plate shown in FIG. 3 (a) or (d) in the opening at the front of the housing, so that when the bulb 7 is connected to his automobile's electrical system other road users will be alerted and will be able to send for appropriate help. In the case of FIG. 3 (a), a white background and a translucent red cross is employed, whereas in the case of FIG. 3 (d) the background may be red and the lettering white.

Similarly, if the user of the lamp runs out of gasoline, he would fit the plate shown in FIG. 3 (b) in the front of the lamp housing, and this would serve to advise other road users of his plight. Typically, the plate shown in FIG. 3 (b) would have a red background and white lettering. By using the plate shown in FIG. 3 (c), the traveller can advise other CB'ers that his radio is on. I contemplate that the plate shown in FIG. 3 (c) would have a white background and red letters and numbers, the numbers being in "PROJECT-A-TYPE" to make them more easily readable. One other plate (not shown) would be plain white, and this plate may be used to provide uniform lighting outside the traveller's automobile, for example if he has to work on his engine or change a wheel.

The user of the lamp may elect to store plates which are not in use between the nibs at the rear of the housing, and it is for this reason that the nibs are spaced sufficiently to accommodate up to four plates. Alternatively, if the user has duplicate plates he could fit only one plate in the opening at the rear of the housing, this being the same as the plate at the front of the housing, and under these circumstances the information contained in the plate would be transmitted in two directions. In a modification of the lamp (not shown) the housing is not open from front to rear, but a partition is provided slightly to the front of the rear of the housing so as to form a recess for storing plates which are not in use. In either case, the cord 8 and the plug may be stored inside the housing when the lamp is not in use.

It is desirable that one of the bulbs 7 and 11 should be a regular light bulb which remains lit continuously and that the other bulb should be a flasher bulb so as to draw more attention when an emergency message is being transmitted.

It is to be understood that the invention is not limited to the specific construction shown and described, as it will be apparent to those skilled in the art that changes may be made without departing from the principles of the invention as defined in the appended claims.

I claim:

1. In a signal lamp having a housing which has an interior and wall portions defining a first opening providing access to the interior of the housing, an electrical light source mounted in the interior of the housing to provide in operation a light beam which leaves the housing by way of said opening, a translucent member fitted in said opening which member corresponds in overall size and shape to the overall size and shape of said opening so that said light beam passes through the translucent member fitted in the opening when leaving the housing wherein the improvement comprises the provision of a second opening in said housing which is substantially the same shape and size as said first opening and which provides access to the interior of said housing, at least four additional translucent members in which each additional translucent member includes a color filter and indicia thereon so that when any one of said four translucent members are secured in said first opening, the color of the light beam is modulated by the color filter and the indicia are readily visible, means for removably securing any one of said members in said first opening located along the periphery of said first opening, means for removably securing one or more of said members in said second opening located along the periphery thereof, said means located along said second opening being capable of removably retaining one or more of said translucent members in coextensive engagement with one another in said second opening, and said housing being of substantially a hexagonal shape, whereby the means for securing which are located along said second opening may be utilized to store all of said four additional translucent members or some portion thereof as well as retain one of said translucent members in said opening during use.

2. A signal lamp as claimed in claim 1, wherein the housing contains an auxiliary light source which can be interchanged with the first-mentioned light source, one of said light sources being adapted to provide a constant light output while the other light source is adapted to provide an intermittingly flashing light output, and means for removably retaining either light source when not in use.

3. A signal lamp as claimed in claim 2 wherein the housing is provided with a clip portion to enable the lamp to be secured to a window of an automobile.

4. In a signal lamp having a housing which has an interior and wall portions defining a first opening providing access to the interior of the housing, an electrical light source mounted in the interior of the housing to provide in operation a light beam which leaves the housing by way of said opening, a translucent member fitted in said opening which member corresponds in overall size and shape to the overall size and shape of said opening so that said light beam passes through the translucent member fitted in the opening when leaving the housing wherein the improvement comprises the provision of a second opening in said housing which is substantially the same shape and size as said first opening and which provides access to the interior of said housing, at least four additional translucent members in which each additional translucent member includes a color filter and indicia thereon so that when any one of said four translucent members are secured in said first opening, the color of the light beam is modulated by the color filter and the indicia are readily visible, means for removably securing any one of said members in said first opening located along the periphery of said first opening, means for removably securing one or more of said members in said second opening located along the periphery thereof, said means located along said second opening being capable of removably retaining one or more of said translucent members in coextensive engagement with one another in said second opening, and said housing being of substantially a hexagonal shape, whereby the means for securing which are located along said second opening may be utilized to store all of said four additional translucent members or some portion thereof as well as retain one of said translucent members in said opening during use, the housing containing an auxiliary light source which can be interchanged with the first mentioned light source, one of said light sources being adapted to provide a constant light output while the other light source is adapted to provide an intermittingly flashing light output, means for removably retaining either light source when not in use, and a clip portion to enable the lamp to be secured to a window of an automobile.

* * * * *